US012536322B2

(12) United States Patent
Kim et al.

(10) Patent No.: US 12,536,322 B2
(45) Date of Patent: Jan. 27, 2026

(54) METHOD FOR PROVIDING POINT-OF-INTEREST INFORMATION, AND ELECTRONIC DEVICE SUPPORTING SAME

(71) Applicant: Samsung Electronics Co., Ltd., Suwon-si (KR)

(72) Inventors: Donggeon Kim, Suwon-si (KR); Hwangki Min, Suwon-si (KR); Seungyeol Yoo, Suwon-si (KR); Seokho Yoon, Suwon-si (KR); Chungki Lee, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 18/307,495

(22) Filed: Apr. 26, 2023

(65) Prior Publication Data
US 2023/0258470 A1    Aug. 17, 2023

Related U.S. Application Data

(63) Continuation of application No. PCT/KR2021/015449, filed on Oct. 29, 2021.

(30) Foreign Application Priority Data

Oct. 29, 2020  (KR) .................. 10-2020-0142375

(51) Int. Cl.
*G06F 21/62* (2013.01)

(52) U.S. Cl.
CPC ................. *G06F 21/6245* (2013.01)

(58) Field of Classification Search
CPC ............ G01C 21/3811; G01C 21/3679; G06F 21/6245; G06F 16/29; G01S 19/13
(Continued)

(56) References Cited

U.S. PATENT DOCUMENTS 8,046,004 B2   10/2011   Tsuchiya
8,050,690 B2   11/2011   Neeraj
(Continued)

FOREIGN PATENT DOCUMENTS

KR   10-2006-0131069 A   12/2006
KR   10-2009-0126399 A   12/2009
(Continued)

OTHER PUBLICATIONS

NPL Search Terms (Year: 2025).*
(Continued)

*Primary Examiner* — Syed A Zaidi
(74) *Attorney, Agent, or Firm* — Jefferson IP Law, LLP

(57) ABSTRACT

An electronic device is provided. The electronic device includes a global positioning system (GPS) module, a communication module, and a processor functionally connected to the GPS module and the communication module. The processor is configured to obtain second location information by refining the first location information, when the second location information is first sensitive information, filter the second location, and when the second location information is not the first sensitive information, convert the second location information into point-of-interest (POI) information on the basis of a mapping table, when the POI information is second sensitive information, filter the POI information, when the POI information is not the second sensitive information, transmit the POI information to an external electronic device through the communication module, and receive update information from the external electronic device in response to the transmission of the POI information.

15 Claims, 8 Drawing Sheets

(58) Field of Classification Search
USPC .......................................................... 726/26
See application file for complete search history.

(56) References Cited

U.S. PATENT DOCUMENTS

| | | | |
|---|---|---|---|
| 9,641,967 | B2 | 5/2017 | Choi et al. |
| 11,122,424 | B1* | 9/2021 | Branscomb ......... H04W 12/033 |
| 2010/0198814 | A1 | 8/2010 | Petersen et al. |
| 2011/0153190 | A1 | 6/2011 | Rolinski et al. |
| 2011/0313657 | A1 | 12/2011 | Myllymaki et al. |
| 2014/0059695 | A1* | 2/2014 | Parecki ................. H04W 12/08 726/26 |
| 2014/0213304 | A1 | 7/2014 | Beckett et al. |
| 2015/0007043 | A1 | 1/2015 | Steinmetz |
| 2015/0073709 | A1 | 3/2015 | Huang |
| 2016/0253407 | A1 | 9/2016 | Ding et al. |
| 2017/0215042 | A1 | 7/2017 | Lee |
| 2020/0041298 | A1* | 2/2020 | Sheth ................. G01C 21/3679 |
| 2020/0058039 | A1 | 2/2020 | Russo et al. |
| 2021/0357531 | A1* | 11/2021 | Pechersky ............. H04L 67/535 |
| 2021/0365812 | A1* | 11/2021 | Bennati ............... G06F 16/2455 |
| 2022/0277002 | A1* | 9/2022 | Drozd ..................... G06F 16/29 |
| 2023/0093267 | A1* | 3/2023 | Levy .................. G06F 21/6245 705/14.66 |
| 2024/0152563 | A9* | 5/2024 | Petersen ............. G06F 16/9537 |

FOREIGN PATENT DOCUMENTS

| | | |
|---|---|---|
| KR | 10-2013-0094290 A | 8/2013 |
| KR | 10-2014-0093772 A | 7/2014 |
| KR | 10-1648641 B1 | 8/2016 |
| KR | 10-2017-0088559 A | 8/2017 |
| WO | 02/060191 A2 | 8/2002 |

OTHER PUBLICATIONS

Calderoni, Luca, Paolo Palmieri, and Dario Maio. "Location privacy without mutual trust: The spatial Bloom filter." Computer communications 68 (2015): 4-16. (Year: 2015).*

Korean Office Action dated Sep. 8, 2025, issued in Korean Application No. 10-2020-0142375.

International Search Report dated Feb. 21, 2022, issued in International Application No. PCT/KR2021/015449.

* cited by examiner

METHOD FOR PROVIDING POINT-OF-INTEREST INFORMATION, AND ELECTRONIC DEVICE SUPPORTING SAME

CROSS-REFERENCE TO RELATED APPLICATION(S)

This application is a continuation application, claiming priority under § 365(c), of an International application No. PCT/KR2021/015449, filed on Oct. 29, 2021, which is based on and claims the benefit of a Korean patent application number 10-2020-0142375, filed on Oct. 29, 2020, in the Korean Intellectual Property Office, the disclosure of which is incorporated by reference herein in its entirety.

BACKGROUND

1. Field

The disclosure relates to a method for providing point of interest (POI) information and an electronic device supporting the same.

2. Description of Related Art

An electronic device (e.g., a smart phone) may provide various functions to users. The electronic device may provide a voice communication function, a local area wireless communication (e.g., Bluetooth) function, a mobile communication (e.g., $4^{th}$ generation (4G) or $5^{th}$ generation (5G)) function, and a content playback function. In addition, the electronic device may provide a navigation function that provides location information to a user through a global positioning system (GPS) or a sensor.

The above information is presented as background information only to assist with an understanding of the disclosure. No determination has been made, and no assertion is made, as to whether any of the above might be applicable as prior art with regard to the disclosure.

SUMMARY

An electronic device may provide location information to a user through a GPS or a sensor. The electronic device may convert the obtained location information into point of interest (POI) information so that the user may easily search and find results, and provide the information. However, when analyzing location information to obtain POI information, the electronic device may have a problem of generating sensitive POI information unintended by the user or providing the generated sensitive POI information to the user. Accordingly, in order to protect the user's privacy, options were provided to manually delete sensitive POI information manually or collectively delete the generated sensitive POI information by withdrawing the consent of the user location information providing service. However, when the user manually deletes POI information, it is not possible to prevent the generation of sensitive POI information in advance, and there may be inconveniences that must be dealt with afterwards. When the consent of the location information providing service is withdrawn, there may be a problem in that the location information service may not be provided to the user.

In case that the user's sensitive POI information exists in the process of converting the GPS information obtained by the electronic device into POI information, various embodiments disclosed in the disclosure are intended to provide location information services to users while preemptively preventing generation of sensitive POI information by filtering sensitive POI information and transmitting POI information in which sensitive POI information does not exist to a server.

Aspects of the disclosure are to address at least the above-mentioned problems and/or disadvantages and to provide at least the advantages described below. Accordingly, an aspect of the disclosure is to provide a method for providing POI information and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a GPS module, a communication module, and a processor functionally connected to the GPS module and the communication module. The processor is configured to second location information by refining first location information in case of obtaining the first location information that is a current location of the electronic device through the GPS module, determine whether the second location information is first sensitive information, based on first security configuration information, filter the second location information in case that the second location information is the first sensitive information, and convert the second location information into point of interest (POI) information based on a mapping table in case that the second location information is not the first sensitive information, determine whether the POI information is second sensitive information, based on second security configuration information, filter the POI information in case that the POI information is the second sensitive information, and transmit the POI information to an external electronic device through the communication module in case that the POI information is not the second sensitive information, and receive update information from the external electronic device in response to the transmission of the POI information.

In accordance with another aspect of the disclosure, an electronic device is provided. The electronic device includes a communication module, a memory, and a processor functionally connected to the communication module and the memory. The processor may transmit a mapping table stored in the memory to an external electronic device through the communication module. When receiving point of interest (POI) information from the external electronic device, the processor may generate update information based on the POI information through a filtering generation module included in the memory. The processor may transmit the generated update information to the external electronic device through the communication module.

In accordance with another aspect of the disclosure, a method of an electronic device is provided. The method includes obtaining second location information by refining the first location information in case of obtaining first location information that is a current location of the electronic device through the GPS module, determining whether the second location information is first sensitive information based on first security configuration information, filtering the second location information in case that the second location information is the first sensitive information, converting the second location information into point of interest (POI) information based on a mapping table in case that the second location information is not the first sensitive information, determining whether the POI information is second sensitive information based on second security configuration information, filtering the POI information in case that the POI information is the second sensitive information, and transmitting the POI information to an external electronic device through the communication module in case that the POI information is not the second sensitive information, and receiving update information from the external electronic device in response to transmitting the POI information.

According to various embodiments disclosed in the disclosure, a method for providing POI information and an electronic device supporting the method may minimize occurrence of human error by filtering sensitive information during the process of converting location information into POI information to prevent generation of POI information that the user is sensitive to in advance. In addition, because the consent of the location information providing service is not withdrawn in order to prevent the generation of POI information that the user is sensitive to in advance, it may be possible to provide a location information related service to the user while preventing POI information including sensitive information from being generated.

In addition to this, various effects identified directly or indirectly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and sprit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
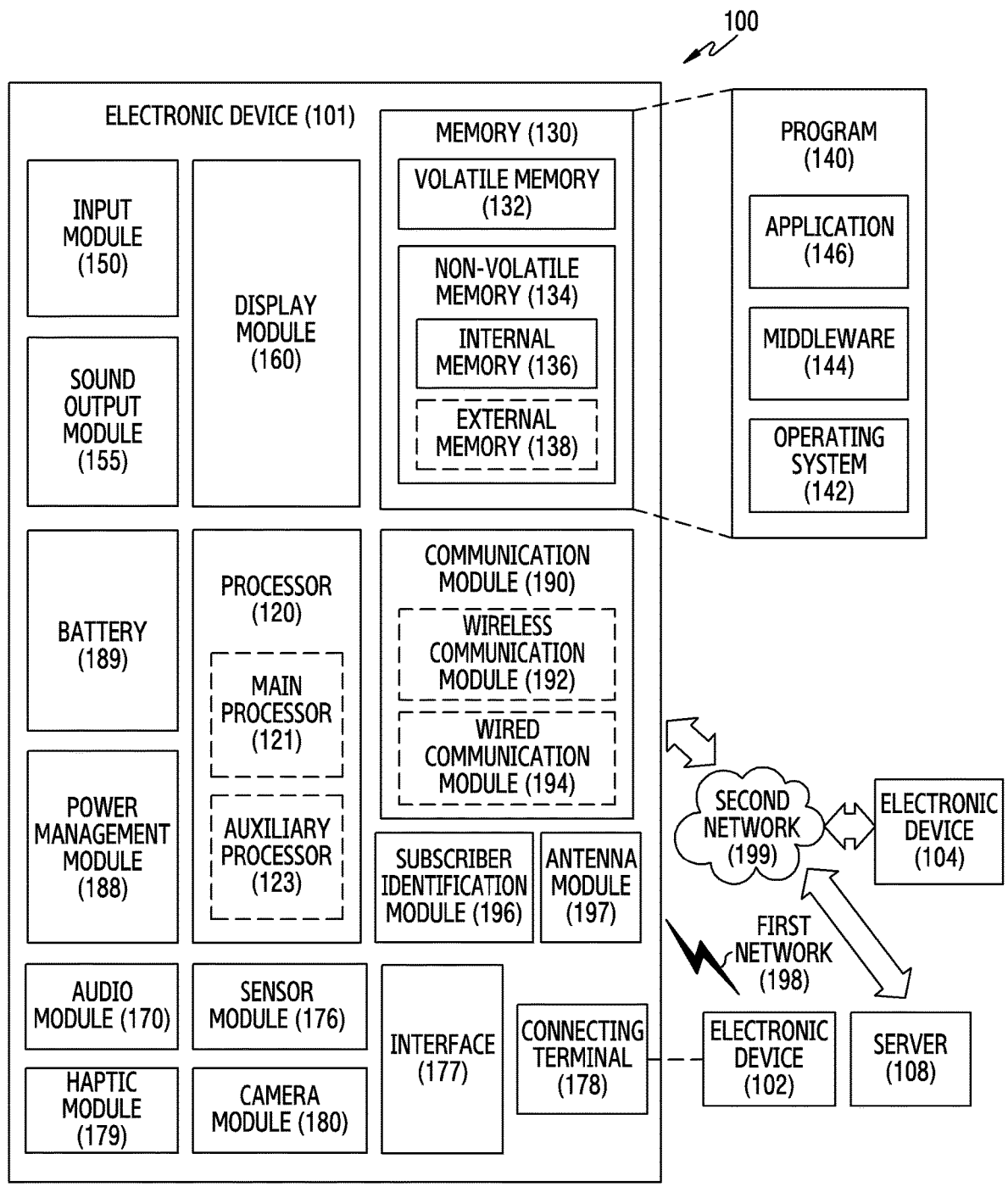
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
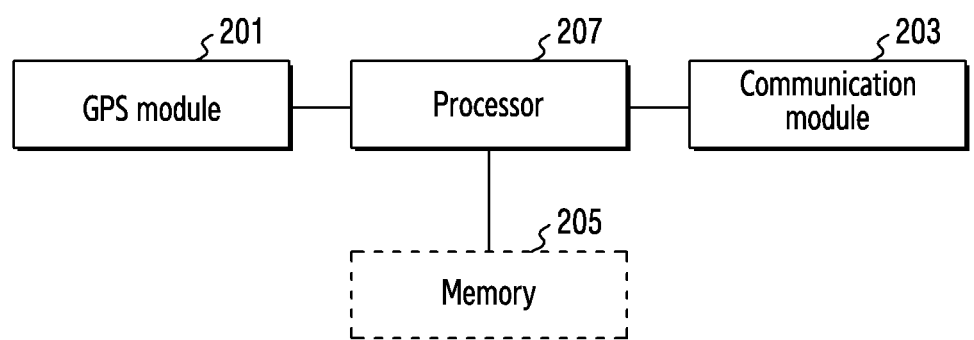
FIG. 2 is a block diagram of an electronic device according to an embodiment of the disclosure.

FIG. 2 is a block diagram of an electronic device according to an embodiment of the disclosure.

Referring to FIG. 2, the electronic device 200 (e.g., the electronic device 101 of FIG. 1) may obtain location information through a GPS module or a sensor. The location information may include latitude and longitude values of a location where the electronic device is currently located. The electronic device 200 may convert the obtained location information into point of interest (POI) information. The electronic device 200 may convert or extract location information composed of latitude and longitude values into the POI information composed of address values (e.g., Baskin Robbins 31) of buildings and stores displayed on an electronic map so that a user may easily recognize the location information. In the process of converting or extracting the location information into the POI information, the electronic device 200 may filter sensitive POI information not intended by the user. The electronic device 200 may filter the sensitive POI information, and store the generated POI information or transmit the same to an external electronic device (e.g., the electronic device 102 or 104) or the server 108.

According to an embodiment, the electronic device 200 may include a GPS module 201 (e.g., the sensor module 176 of FIG. 1), a communication module 203 (e.g., the communication module 190 of FIG. 1), a memory 205 (e.g., the memory 130 of FIG. 1) and a processor 207 (e.g., the processor 120 of FIG. 1). However, the configuration of the electronic device 200 is not limited thereto.

According to various embodiments, the electronic device 200 may omit at least one of the above-described components and may include at least one other component. For example, the electronic device 200 may include a display module (e.g., the display module 160 of FIG. 1). The electronic device 200 may provide POI information to the user through the display module.

According to an embodiment, the processor 207 may obtain first location information where the electronic device 200 is currently located through the GPS module 201. The location information may be information composed of latitude and longitude where the electronic device 200 is currently located. The processor 207 may obtain second location information by refining the obtained first location information. The processor 207 may obtain refined second location information by removing noise from the first location information or performing reverse geocoding.

According to an embodiment, the processor 207 may convert the obtained second location information into point of interest (POI) information. The processor 207 may receive a mapping table from an external electronic device (e.g., a server) connected through the communication module 203. The mapping table may be a database for converting or extracting location information (e.g., the second location information) into POI information.

According to an embodiment, the processor 207 may determine whether to filter the location information based on first security configuration information in the process of converting the second location information into the POI information. The first security configuration information is reference information for determining whether the second location information is first sensitive information to which the user is sensitive, and may be information stored in the memory 205. The determining whether the second location information is first sensitive information based on the first security configuration information will be described in detail with reference to FIG. 4.

According to an embodiment, the processor 207 may filter the second location information when determining that the second location information is first sensitive information. The processor 207 may filter the second location information through a filtering module stored in the memory 205. The filtering module may be an application for determining that the second location information is first sensitive information and performing filtering when the second location information is first sensitive information. The filtered second location information may not be converted into the POI information by the processor 207. That is, the second location information filtered by the processor 207 may not be transmitted to the external electronic device (e.g., a server) because the second location information is blocked in the electronic device 200 and is not converted into POI information.

According to an embodiment, when determining that the second location information is not first sensitive information, the processor 207 may convert the second location information into POI information based on the mapping table. The processor 207 may convert the second location information into POI information when the second location information corresponds to a piece of information stored in the mapping table. The processor 207 may receive the mapping table from the external electronic device (e.g., a server) or read the mapping table stored in the external electronic device while connected through the communication module.

According to an embodiment, the processor 207 may determine whether the obtained POI information is second sensitive information based on second security configuration information. The second security configuration information is reference information for determining whether the POI information is second sensitive information to which the user is sensitive, and may be information stored in the memory 205. The determining whether the POI information is the second sensitive information based on the second security configuration information will be described in detail with reference to FIG. 5.

According to an embodiment, the processor 207 may filter the POI information when determining that the POI information is second sensitive information. The processor 207 may filter the POI information through a filtering module previously stored in the memory 205. That is, the filtered POI information may not be transmitted to the external electronic device (e.g., a server) because the filtered POI information is blocked by the processor 207.

According to an embodiment, the processor 207 may transmit the POI information to the external electronic device through the communication module 203 when determining that the POI information is not second sensitive information.

According to an embodiment, the processor 207 may receive update information from the external electronic device in response to transmitting the POI information to the external electronic device. The update information may be information generated based on POI information transmitted to the external electronic device. The update information may be information generated through support vector machines (SVM), similarity analysis, and clustering analysis based on information stored in a POI table of all users and a mapping table in the external electronic device, and if the update information is generated through an unsupervised learning model or a supervised learning model, it is not limited thereto.

According to an embodiment, the processor 207 may update the filtering module stored in the memory 205 based on the received update information. Based on the update information, the processor 207 may determine whether to filter the second location information and the POI information obtained by the electronic device 200 through an updated filtering module, and periodically update the filtering module by transmitting unfiltered POI information to the external electronic device.

Figure 3:
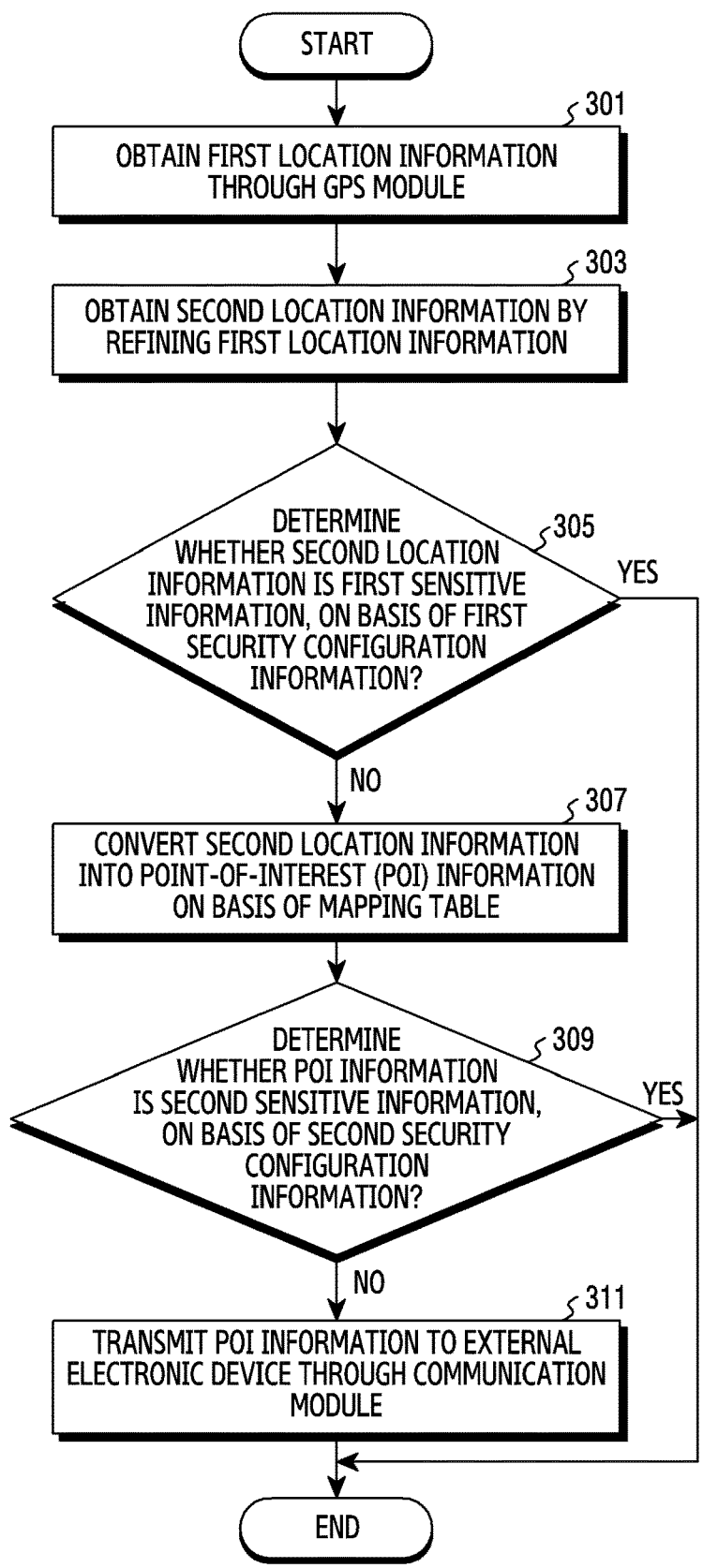
FIG. 3 is a flowchart illustrating a method of providing POI information according to an embodiment of the disclosure.

FIG. 3 is a flowchart illustrating a method of providing POI information according to an embodiment of the disclosure.

Referring to FIG. 3, in operation 301, the processor (e.g., the processor 120 of FIG. 1 or the processor 207 of FIG. 2) of the electronic device (e.g., the electronic device 101 of FIG. 1 or the electronic device 200 of FIG. 2) may obtain a first location information through a GPS module (e.g., the sensor 176 of FIG. 1 or the GPS module 201 of FIG. 2).

According to an embodiment, the processor may obtain the first location information indicating the current location of the electronic device through the GPS module.

In operation 303, the processor may obtain a second location information by refining the first location information.

According to an embodiment, the processor may obtain the second location information by removing the noise from the obtained first location information or by reverse geocoding. The processor may convert the first location information consisting of longitude and latitude coordinates through the reverse geocoding to the second location information consisting of a road-based new address. For example, the first location information with the coordinate value of 37.571980 and 126.972511 may be converted to the second location information of the new address of "19, Saemunan-ro 3-gil, Dangju-dong, Jongno-gu, Seoul" through the reverse geocoding.

In operation 305, the processor may determine whether the second location information is first sensitive information based on a first security configuration information.

According to an embodiment, when the second location information corresponds to a security item included in the first security configuration information, the processor may determine the second location information as the first sensitive information. The first security configuration information may include security items of a specific time, place and area density preconfigured by the user, and descriptions related to the specific time, specific place and specific area density will be described in detail with reference to FIG. 4.

According to an embodiment, the processor may filter the second location information when determining that the second location information is the first sensitive information. The processor 207 may filter the second location information so as not to be converted into point of interest (POI) information through a filtering module included in a memory (e.g., the memory 130 of FIG. 1 or the memory 205 of FIG. 2). For example, the processor may determine whether the time at which the second location information is obtained corresponds to a specific time based on the first security configuration information. When the specific time range is configured to 14:00 to 15:00, the processor may identify that the second location information obtained at 14:00 to 15:00 is the first sensitive information to which the user is sensitive. That is, the processor may filter the second location information obtained at 14:00 to 15:00 through the filtering module so as not to be converted into POI information.

According to an embodiment, the processor may perform operation 307 when the second location information is not the first sensitive information.

In operation 307, the processor may convert the second location information into POI information based on a mapping table.

According to an embodiment, the processor may receive the mapping table from an external electronic device (e.g., a server) through a communication module (e.g., the communication module 190 in FIG. 1 or the communication module 203 in FIG. 2) or read the mapping table stored in the external electronic device. The mapping table may be a database required to convert the second location information into point of interest (POI) information so that the user may easily search and find results.

According to an embodiment, the processor may obtain the POI information by mapping the second location information and the interest point corresponding to the second location information based on the mapping table. For example, when the new address corresponds to "Baskin Robbins 31" that is one of the interest points included in the second location information, the second location information may be converted to POI information.

In operation 309, the processor may determine whether the POI information is the second sensitive information based on the second security configuration information.

According to an embodiment, the processor may determine the POI information as the second sensitive information when the POI information is corresponding to the security item included in the second security configuration information. The second security configuration information may include a category and a context security item preconfigured by the user, and is not limited thereto. The description related to the category and the context will be described in detail in FIG. 5.

According to an embodiment, the processor 207 may filter the POI information so as not to be transmitted to the external electronic device when determining that the POI information is the second sensitive information. The processor may filter the POI information through the filtering module included in the memory (e.g., the memory 130 of FIG. 1 or the memory 205 of FIG. 1). For example, the processor may identify whether the category of the POI information corresponds to the category based on the second security configuration information. The processor may identify the category of the POI information when the category is configured in advance as "downtown" and confirm that the category of the POI information is "downtown". That is, when the category of the POI information is the "downtown", the processor may determine that the POI information is the second sensitive information to which the user is sensitive. Accordingly, the processor may filter the POI information with the "downtown" category through the filtering module so as not to be transmitted to the external electronic device.

According to an embodiment, the processor may perform operation 311 when the POI information is not the second sensitivity information.

In operation 313, the processor may transmit the POI information to the external electronic device through the communication module.

According to an embodiment, the processor may transmit the POI information to the external electronic device (e.g., a server) when the POI information does not correspond to the security item based on the second security configuration information.

According to an embodiment, the processor may receive update information from the external electronic device in response to transmitting the POI information to the external electronic device (e.g., a server). The processor may update the filtering module included in the memory (e.g., the memory 130 of FIG. 1 or the memory 205 of FIG. 2) based on the update information.

Figure 4:
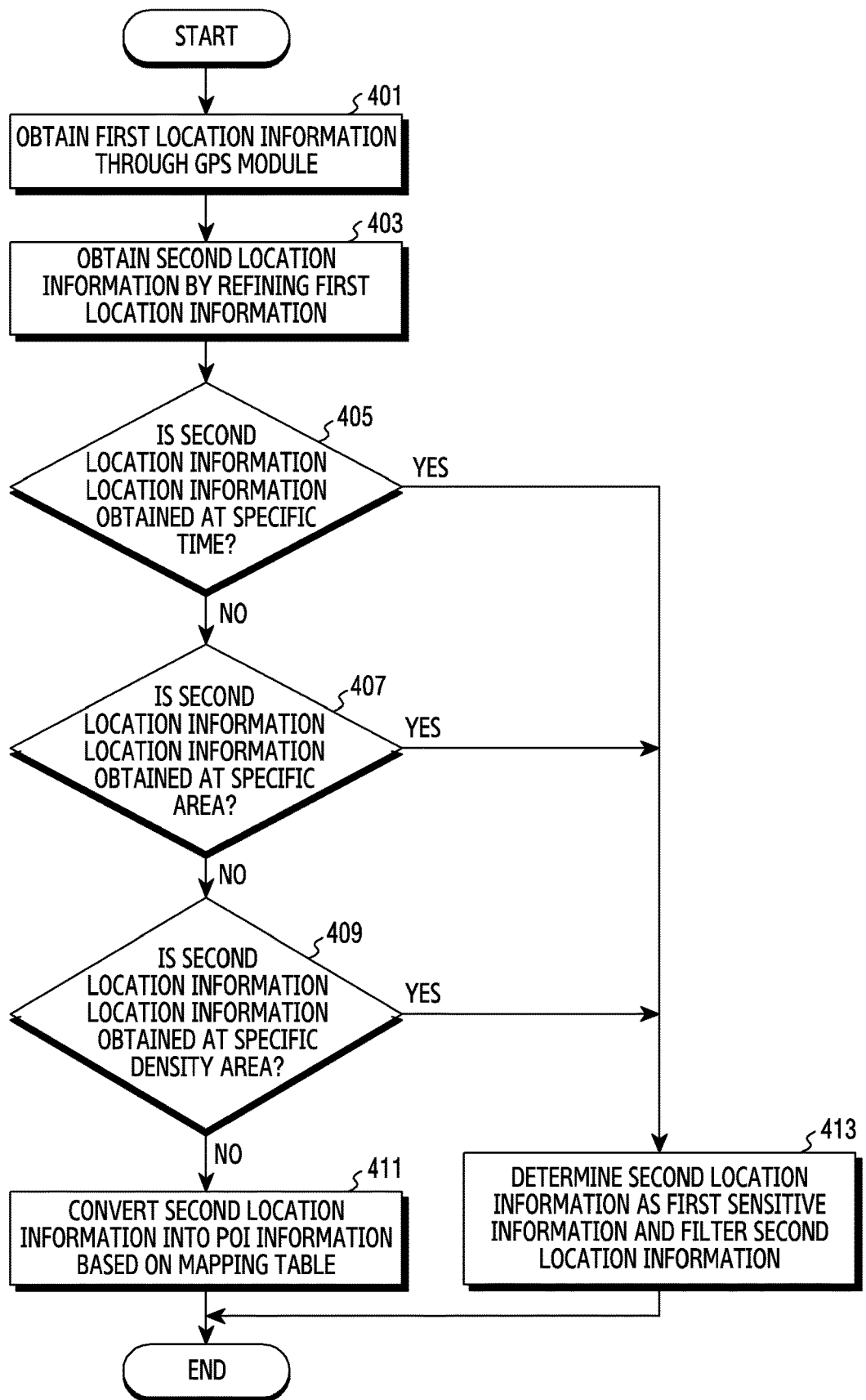
FIG. 4 is a flowchart illustrating a method of filtering second location information according to an embodiment of the disclosure.

FIG. 4 is a flowchart illustrating a method of filtering second location information according to an embodiment of the disclosure.

Referring to FIG. 4, in operation 401, the processor (e.g., the processor 120 of FIG. 1 or the processor 207 of FIG. 2) of the electronic device (e.g., the electronic device 200 of FIG. 1 or the electronic device 101 of FIG. 2) may obtain a first location information through a GPS module (e.g., the sensor 176 of FIG. 1 or the GPS module 201 of FIG. 2).

According to an embodiment, the processor may obtain the first location information including the longitude and latitude values of the current location of the electronic device through the GPS module. For example, the processor may obtain the first location information with a value of 37.466539 and 127.022745 through the GPS module.

In operation 403, the processor may obtain a second location information by refining the first location information.

According to an embodiment, the processor may remove the noise from the obtained first location information. The processor may convert the first location information from which the noise has been removed into the second location information by reverse geocoding. The processor may convert the first location information including the longitude and latitude values through the reverse geocoding into the new address-based second location information. For example, the processor may obtain the second location information including a new address of "Seongchon-gil 56, Yangjae 1-dong, Seocho-gu, Seoul" by removing the noise from the first location information with the value of 37.466539, 127.022745 and applying the reverse geocoding.

In operation 405, the processor may determine whether the second location information is the location information obtained at a specific time.

According to an embodiment, the processor may determine whether the second location information is the first sensitive information based on the first security configuration information preconfigured by the user. The first security configuration information may include security items related to a specific time. For example, a specific time based on the first security configuration information may be configured at 18:00 to 18:30. The processor may determine the second location information as the first sensitive information when the time at which the second location information is obtained is included in the specific time. The first sensitive information may be sensitive location information to the user.

According to an embodiment, the processor may perform operation 413 when the time at which the second location information is obtained is included in the specific time.

In operation 413, the processor may determine the second location information as the first sensitive information and filter the second location information.

According to an embodiment, when the second location information is determined to be the first sensitive information, the processor may filter (e.g., filter a specific time) the second location information so as to prevent the second location information from being converted into POI information through POI conversion. For example, when the time at which the second location information is obtained is 18:20, the processor may identify that the time at which the second location information is obtained is included in the specific time (e.g., 18:00 to 18:30). The processor may determine that the second location information is the first sensitive information. Accordingly, the processor may filter the second location information obtained at 18:30 so as not to be transmitted to the external electronic device (e.g., a server) or converted into POI information. Filtering the second location information based on the specific time may be specific time filtering.

According to an embodiment, in operation 405, the processor may perform operation 407 when identifying that the second location information is not information obtained at a specific time.

In operation 407, the processor may determine whether the second location information is location information obtained in a specific area.

According to an embodiment, the processor may determine whether the second location information is the first sensitive information based on the first security configuration information preconfigured by a user. The first security configuration information may include a security item related to a specific area. For example, the specific area based on the first security configuration information may be configured as "park". When the area where the second location information is obtained is the park, the processor may determine the second location information as the first sensitive information. The first sensitive information may be sensitive location information to the user.

According to an embodiment, the processor may perform operation 413 when the area where the second location information is obtained corresponds to the specific area.

In operation 413, the processor may determine the second location information as the first sensitive information and filter the second location information.

According to an embodiment, when the second location information is determined to be the first sensitive information, the processor may filter (e.g., filter a specific area) the second location information so as to prevent the second location information from being converted into POI information through POI conversion.

For example, when the area where the second location information is obtained is "park", the processor may identify that the area where the second location information is obtained is included in the specific area (e.g., a park). The processor may determine that the second location information is the first sensitive information. Accordingly, the processor may filter the second location information obtained from the park so as not to be transmitted to the external electronic device (e.g., a server) or converted into POI information. Filtering the second location information based on the specific area may be specific area filtering.

According to an embodiment, in operation 407, the processor may perform operation 409 when identifying that the second location information is not information obtained from a specific area.

In operation 409, the processor may determine whether the second location information is location information obtained from a specific density area.

According to an embodiment, the processor may determine whether the second location information is the first sensitive information based on the first security configuration information preconfigured by a user. For example, the specific density area based on the first security configuration information may be configured to "1000 times". The processor may determine the second location information as the first sensitive information when the area for obtaining the second location information is an area in which the second location information of another user is obtained less than "1000 times".

According to an embodiment, the first security configuration information may include a security item related to the specific density area. The processor may receive information (e.g., the second location information of other users and the number of obtaining times of the second location information) related to the specific density area from the external electronic device (e.g., a server). In addition, the processor may store information related to the specific density area in a filtering module of a memory.

According to an embodiment, the processor may perform operation 413 when the area where the second location information is obtained is an area where the second location information of another user is obtained with a value less than a specified value.

In operation 413, when the area where the second location information is obtained is the area where the second location information of another user is less than the specified value, the processor may determine the second location information as the first sensitive information. The processor may filter the second location information determined as the first sensitive information. The processor may block the filtered second location information so as not to be converted into POI.

According to an embodiment, in operation 409, the processor may perform operation 411 when identifying that the second location information is not information obtained from the specific area.

In operation 411, the processor may convert the second location information into POI information based on the mapping table.

According to an embodiment, the processor may receive the mapping table from the external electronic device (e.g., a server) or read the mapping table stored in the external electronic device. The mapping table may be a database required to convert the second location information including the new address into POI information, which is point of interest information, so that the user may easily search and utilize the same.

According to an embodiment, when the point of interest information corresponding to the new address of the second location information exists in the information included in the mapping table, the processor may convert the second location information into POI information. For example, when the second location information with the address "19, Saemunan-ro 3-gil, Dangju-dong, Jongno-gu, Seoul" corresponds to "subway" in the information included in the mapping table, the processor may convert the second location information into POI information, which is information on a point of interest called "subway".

According to another embodiment, the processor may change the order of at least one of operations 405, 407, and 409.

Figure 5:
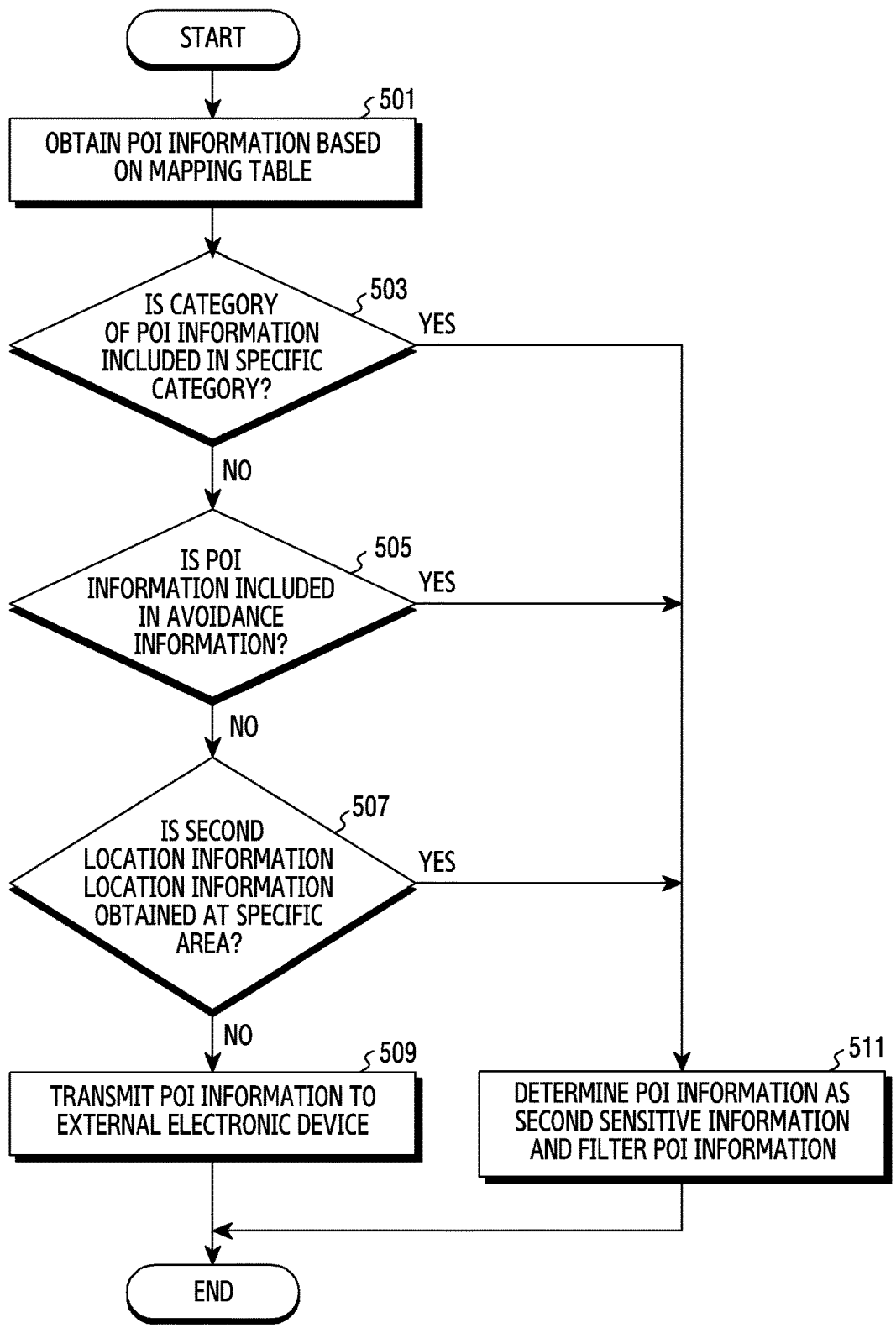
FIG. 5 is a flowchart illustrating a method of filtering POI information according to an embodiment of the disclosure.

FIG. 5 is a flowchart illustrating a method of filtering POI information according to an embodiment of the disclosure.

Referring to FIG. 5, in operation 501, the processor (e.g., the processor 120 of FIG. 1 or the processor 207 of FIG. 2) of the electronic device (e.g., the electronic device 101 of FIG. 1 or the electronic device 200 of FIG. 2) may obtain POI information based on a mapping table.

According to an embodiment, when determining that the obtained second location information is not the first sensitive information, the processor may convert the second location information into first POI information based on the mapping table. The mapping table is a database for converting the second location information including new addresses into POI information, which is information on a point of interest (e.g., a building name, a business name) that is easy for a user to search for and utilize, and may be received through an external electronic device (e.g., a server). In addition, the processor may read information from the mapping table stored in the external electronic device.

According to an embodiment, when there is a point of interest corresponding to the address of the second location information in the information included in the mapping table, the processor may convert the second location information into POI information corresponding to the point of interest. For example, when the address of the second location information is "55, Saemunan-ro 5-gil, Sajik-dong, Jongno-gu, Seoul", the processor may identify that the point of interest corresponding to the address in the information included in the mapping table is a "Starbucks Jeokseon store". The processor may convert the second location information into POI information, which is information on a point of interest, such as "Starbucks Jeokseon store".

In operation 503, the processor may determine whether the category of POI information is included in a specific category.

According to an embodiment, the processor may determine the POI information as the second sensitive information when the POI information is included in the security item included in the second security configuration information. The second security configuration information may include security items of category filtering, smart filtering, and context filtering preconfigured by the user, but is not limited thereto.

According to an embodiment, the processor may perform operation 511 when the category of the POI information is included in a specific category based on the second security configuration information.

In operation 511, the processor may determine POI information as the second sensitive information and filter the POI information.

According to an embodiment, the processor may determine the POI information as the second sensitive information when the category of the POI information is included in the specific category. The specific category may be a category previously specified by the user. For example, the specific category based on the second security configuration information may be configured to "café and restaurant". When the category of the POI information is "café", the processor may identify that the category of the POI information is included in the specific category. When determining that the POI information is the second sensitive information, the processor may filter the POI information so as not to be transmitted to the external electronic device (e.g., a server). Filtering the POI information based on the specific category may be category filtering.

According to an embodiment, in operation 503, the processor may perform operation 505 when identifying that the POI information is not the second sensitive information.

In operation 505, the processor may determine whether the POI information is included in avoidance information.

According to an embodiment, the processor may receive avoidance information from the external electronic device (e.g., a server). The avoidance information may include POI information of other users that has been frequently requested to delete from other users, POI information that violates general data protection regulation (GDPR), and sensitive information generated by unsupervised learning or supervised learning in the external electronic device.

According to an embodiment, the processor may determine whether the POI information is the second sensitive information based on the avoidance information received from the external electronic device. For example, the processor may determine the POI information as the second sensitive information when the POI information is included in the information for which there are many deletion requests from other users included in the avoidance information. The processor may perform operation 511 when determining the POI information as the second sensitive information.

In operation 511, the processor may determine POI information as the second sensitive information and filter the POI information.

According to an embodiment, when the POI information is included in the avoidance information, the processor may determine the POI information as the second sensitive information. The avoidance information may be information stored in the filtering module. The avoidance information is received from the external electronic device, and may be included in update information generated by the external electronic device through an entire user POI table and a filtering generation module. Descriptions related to the update information will be disclosed in detail in FIG. 3. For example, the avoidance information based on the second security configuration information may be POI information violating GDPR. When the avoidance information corresponds to "cathedral", the processor may identify that the POI information is included in the avoidance information when the obtained POI information is "cathedral". When the POI information is included in the avoidance information, the processor may determine the POI information as the second sensitive information. When determining that the POI information is the second sensitive information, the processor may filter the POI information so as not to be transmitted to the external electronic device (e.g., a server). Filtering the POI information based on the avoidance information may be smart filtering.

According to an embodiment, in operation 505, the processor may perform operation 507 when identifying that the POI information is not the second sensitive information.

In operation 507, the processor may determine whether the context of the POI information is included in a specific context.

According to an embodiment, the processor may determine whether the context of the POI information is included in a specific context based on the second security configuration information. The specific context may include POI information related to a place, a person, a situation, and the like. For example, the specific context may be configured as a context related to "specific person A". The processor may identify whether the POI information is POI information obtained at a place located together with a "specific person A". The processor may receive POI information of "specific person A" from the external electronic device (e.g., a server) or identify POI information of "specific person A" stored in the filtering module. The processor may perform operation 511 when the obtained POI information is related to the POI information of "specific person A".

According to an embodiment, the processor may filter not only the POI information but also information including images, videos, address books, and call and text records stored in the electronic device based on the specific context. For example, the specific context based on the second security configuration information may be configured to "specific place B". When images, videos, address books, call and text records related to "specific place B" exist, the processor may filter the existing information.

In operation 511, the processor may determine the POI information as the second sensitive information and filter the POI information.

According to an embodiment, the processor may determine the POI information as the second sensitive information when the context of the POI information is included in a specific context. When determining that the second sensitive information is the second sensitive information, the processor may filter the POI information not to be transmitted to the external electronic device.

In operation 507, the processor may perform operation 509 when the context of the POI information is not included in the specific context.

In operation 509, the processor may transmit the POI information to the external electronic device.

According to an embodiment, when the POI information does not correspond to a security item (e.g., specific category, smart, specific context) based on the second security configuration information, the processor may transmit the POI information to the external electronic device (e.g., a server).

According to an embodiment, the processor may receive update information from the external electronic device in response to transmitting the POI information to the external electronic device (e.g., a server). The processor may update a filtering module included in a memory (e.g., the memory 130 of FIG. 1 or the memory 205 of FIG. 2) based on the update information. The update information may include not only the avoidance information, but also specific density area information and POI information of other users, and is not limited thereto as long as the update information may include reference information for filtering POI information based on the second security configuration information.

Figure 6A:
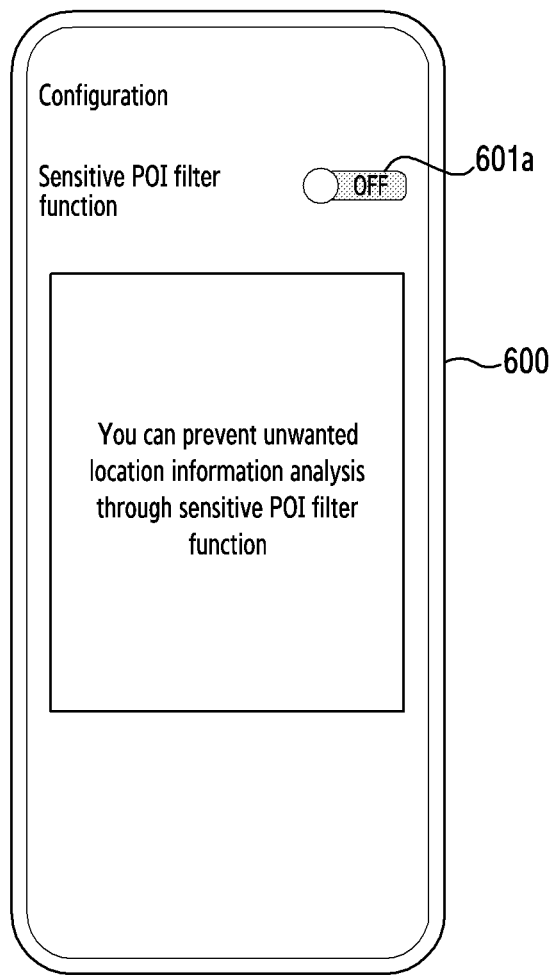
FIGS. 6A and 6B are diagrams illustrating a method for configuring security configuration information according to various embodiments of the disclosure.
Figure 6B:
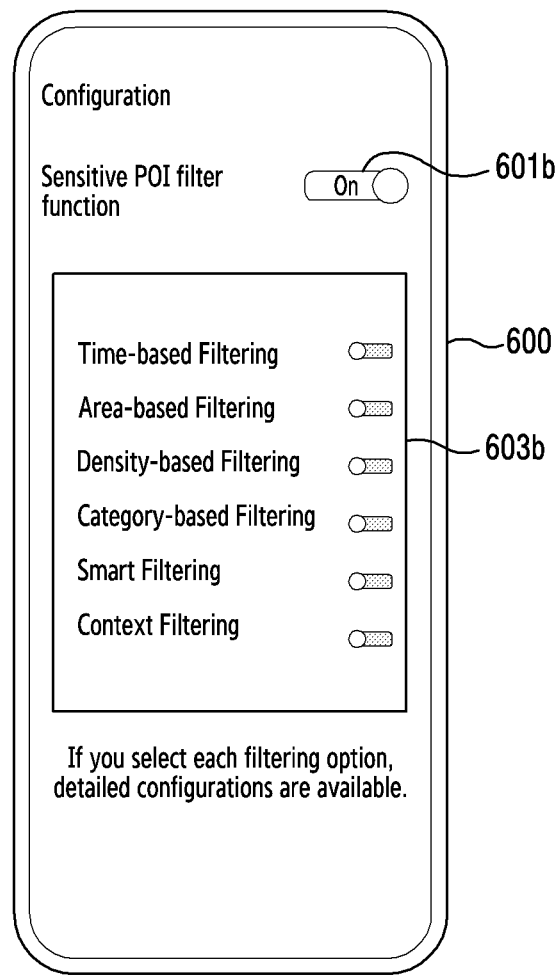

FIGS. 6A and 6B are diagrams illustrating a method for configuring security configuration information according to various embodiments of the disclosure.

Referring to FIG. 6A, an electronic device 600 (e.g., the electronic device 101 of FIG. 1 or the electronic device 200 of FIG. 2) may output a screen requesting security configuration from a user through a display (e.g., the display module 160 of FIG. 1).

According to an embodiment, the electronic device 600 may output a button capable of turning on or off a security configuration function. For example, the electronic device 600 may turn on or off the security configuration function based on the button 601*a* being slid by the user.

According to another embodiment, when obtaining location information including sensitive information while the security configuration function is turned off, the electronic device 600 may output a separate message requesting switching of the security configuration function to the 'on' state.

Referring to FIG. 6B, when the security configuration function is switched to the 'on' state 601*b*, the electronic device 600 may output a security item 603*b* screen.

According to an embodiment, the security item 603*b* screen may include items for configuring a first security configuration information that may perform specific time filtering capable of filtering the second location information based on a specific time, specific area filtering for filtering the second location information based on a specific area, and specific density filtering capable of filtering the second location information based on a specific density area. In addition, the security item 603*b* screen may include not only the first security configuration information, but also items for configuring a second security configuration information capable of category filtering capable of filtering point of interest (POI) information based on a specific category, smart filtering capable of filtering POI information based on avoidance information, and context filtering capable of filtering POI information based on a specific context.

According to an embodiment, the electronic device 600 may selectively switch at least one of a plurality of filtering lists included in the first security configuration information and the second security configuration information to the 'on' state or 'off' state. That is, the electronic device 600 may filter at least one of the second location information and the POI information based on the 'on' state or 'off' state of the plurality of filtering lists.

Figure 7:
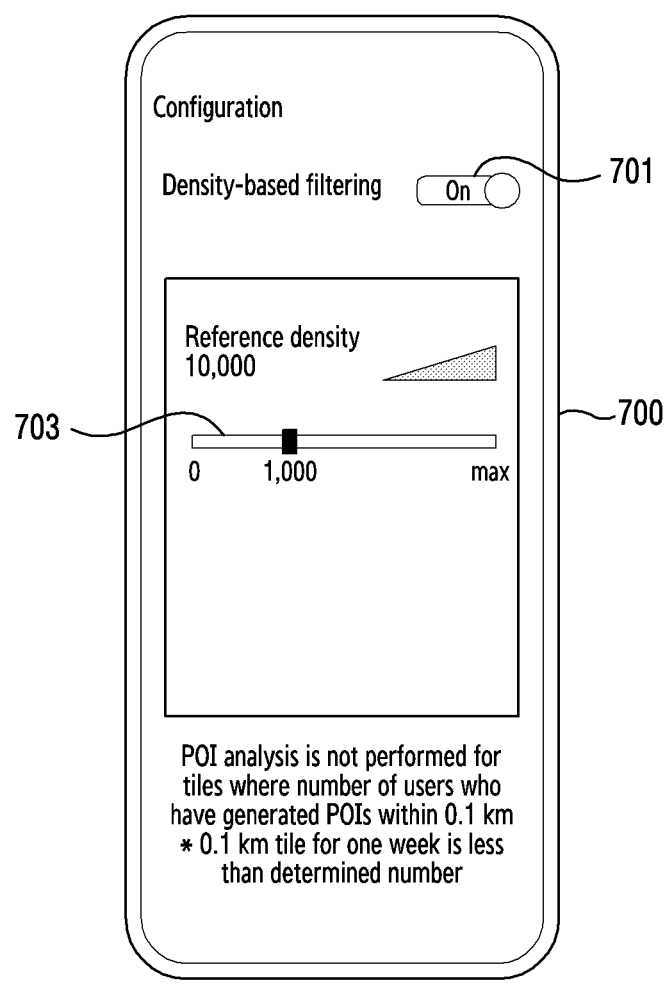
FIG. 7 is a diagram illustrating a specific density area according to an embodiment of the disclosure.

FIG. 7 is a diagram illustrating a specific density area according to an embodiment of the disclosure.

Referring to FIG. 7, an electronic device 700 (e.g., the electronic device 101 of FIG. 1 or the electronic device 200 of FIG. 2) may display a screen for controlling a configuration value for filtering a specific density area.

According to an embodiment, the electronic device 700 may display a security item (e.g., the security item 603b of FIG. 6B) when a security configuration function 701 is switched to on state. The electronic device may switch a specific density area filtering function among a plurality of filtering lists included in the security item to on state.

According to an embodiment, when the specific density filtering function is turned on, the electronic device 700 may display a screen for controlling a specific density value. For example, the electronic device 700 may display a status bar 703 capable of controlling the specific density value. The status bar may adjust the density value according to a user's input.

According to an embodiment, the electronic device 700 may adjust the density value according to the user's input. The electronic device 700 may obtain location information through a GPS module. The electronic device 700 may filter the location information when the area where the location information is obtained is less than the density value. In this case, the electronic device 700 may identify that the location information is obtained in an area less than the configured density value through the filtering module. The filtering module may be periodically updated based on update information received from the external electronic device (e.g., a server). The filtering module may identify that the area where the location information is obtained is an area where a value less than the density value is obtained through the entire user POI DB included in the above update information.

Figures 8A, 8B:
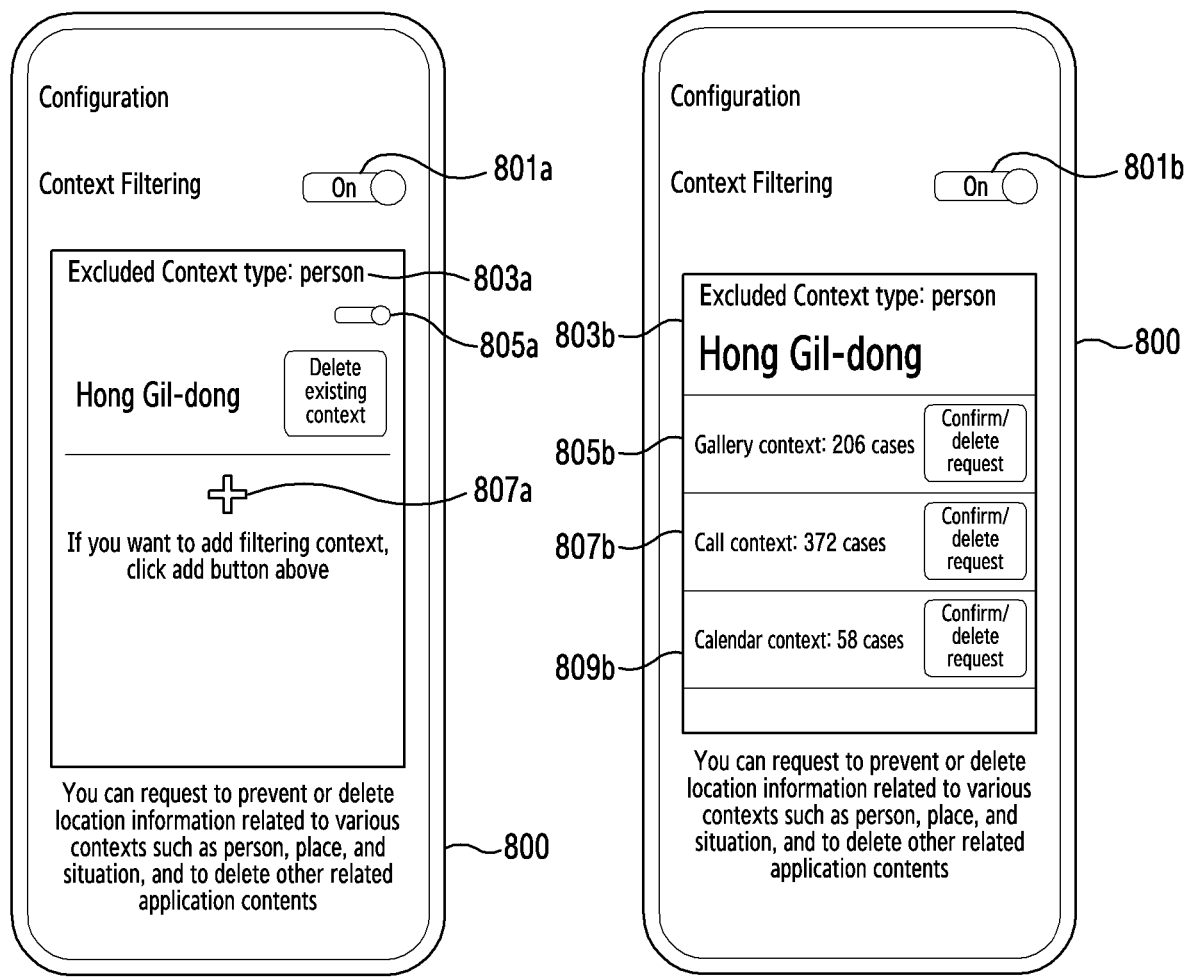
FIGS. 8A and 8B are diagrams illustrating context filtering according to various embodiments of the disclosure.

FIGS. 8A and 8B are diagrams illustrating context filtering according to various embodiments of the disclosure.

Referring to FIG. 8A, an electronic device 800 (e.g., the electronic device 101 of FIG. 1 or the electronic device 200 of FIG. 2) may output a screen requesting security configuration from a user through a display (e.g., the display module 160 of FIG. 1).

According to an embodiment, the electronic device 800 may display a security item (e.g., the security item 603b of FIG. 6B) when a security configuration function 801a and 801b is switched to on state. The electronic device may switch a specific context filtering function among a plurality of filtering lists included in the security item to on state.

According to an embodiment, when the specific context filtering function is turned on, the electronic device 800 may output a screen for configuring a specific context filtering function.

According to an embodiment, when the screen for configuring the specific context filtering function is output, the electronic device 800 may output a detailed screen 803a for configuring a specific context type. A button 805a for switching the function of filtering POI information to on or off state based on the configured context type may be included on the detailed screen 803a. In addition, an icon for deleting the configured specific context type may be included. For example, when the button is switched to off state, a person named "Hong Gil-dong" may be configured as the specific context while the context type is configured to "person". The electronic device 800 may filter POI information related to "Hong Gil-dong". When the POI information of the person named "Hong Gil-dong" is received from the external electronic device, and the POI information obtained by the electronic device 800 is included in the POI information of "Hong Gil-dong", the obtained POI information may be filtered.

According to an embodiment, the electronic device 800 may output an icon 807a for adding another item to be filtered.

Referring to FIG. 8B, the electronic device 800 may filter other information by identifying the context of other information as well as the POI information. The other information may include gallery 805b, call log 807b, and calendar 809b information stored in the electronic device 800 excluding the POI information. In addition, the other information is not limited thereto.

According to an embodiment, the electronic device 800 may filter the other information when the other information including the configured specific context exists. For example, the electronic device 800 may be in a state in which the specific context is configured as "Hong Gil-dong" while the context type is configured to "person". The electronic device 800 may filter other information related to "Hong Gil-dong" when the context related to "Hong Gil-dong" exists in at least one of the gallery 805b, the call log 807b, and the calendar 809b, as shown in screen 803b.

An electronic device according to various embodiments of the disclosure may include a GPS module, a communication module, and a processor functionally connected to the GPS module and the communication module. When the processor obtains first location information that is a current location of the electronic device through the GPS module, the processor may obtain second location information by refining the first location information. The processor may determine whether the second location information is first sensitive information, based on first security configuration information. When the second location information is the first sensitive information, the processor may filter the second location information, and when the second location information is not the first sensitive information, the processor may convert the second location information into point of interest (POI) information based on a mapping table. The processor may determine whether the POI information is second sensitive information, based on second security configuration information. When the POI information is the second sensitive information, the processor may filter the POI information. When the POI information is not the second sensitive information, the processor may transmit the POI information to an external electronic device through the communication module. The processor may receive update information from the external electronic device in response to the transmission of the POI information.

An electronic device according to various embodiments of the disclosure may further include a memory including a filtering module. The processor may filter the first sensitive information and the second sensitive information through the filtering module.

The processor of the electronic device according to various embodiments of the disclosure may update the filtering module based on update information received from the external electronic device.

The processor of the electronic device according to various embodiments of the disclosure may store the POI information in a personal POI table included in the memory when determining that the POI information is not the second sensitive information.

In an electronic device according to various embodiments of the disclosure, the update information may include avoidance information and an entire user POI table stored in the external electronic device.

In an electronic device according to various embodiments of the disclosure, the second location information may include information refined by removing noise and performing reverse geocoding of the first location information.

In an electronic device according to various embodiments of the disclosure, the filtering may include first filtering for filtering the second location information when the second location information is the first sensitive information, and second filtering for filtering the POI information when the POI information is the second sensitive information.

In an electronic device according to various embodiments of the disclosure, the first filtering may include specific time filtering for determining the second location information as the first sensitive information and filtering the second location information when the second location information is obtained at a specific time based on the first security configuration information. The first filtering may include specific area filtering for determining the second location information as the first sensitive information and filtering the second location information when the second location information is obtained at a specific area based on the first security configuration information. The first filtering may include specific density filtering for determining the second location information as the second sensitive information and filtering the second location information when the area where the second location information is obtained is an area where the second location information of another user is obtained less than a specified value.

In an electronic device according to various embodiments of the disclosure, the second filtering may include category filtering for determining the POI information as the second sensitive information and filtering the POI information when a category of the POI information is included in a category based on the second security configuration information. The second filtering may include smart filtering for determining the POI information as the second sensitive information and filtering the POI information when the POI information is included in avoidance information. The second filtering may include specific context filtering for determining the POI information as the second sensitive information and filtering the POI information when a context of the POI information is included in a specified context based on the second security configuration information.

In an electronic device according to various embodiments of the disclosure, the avoidance information may include POI information in which the number of deletion request from other users is greater than or equal to the reference value, POI information in violation of general data protection regulation (GDPR), and sensitive POI information generated by unsupervised learning and supervised learning.

The processor of the electronic device according to various embodiments of the disclosure may filter at least one piece of information related to the specific context among other information stored in the electronic device based on the specific context. The other information may include at least one of image information, video information, address book information, call information, and text record information.

An electronic device according to various embodiments of the disclosure may include a communication module, a memory, and a processor functionally connected to the communication module and the memory. The processor may transmit a mapping table stored in the memory to an external electronic device through the communication module. When receiving point of interest (POI) information from the external electronic device, the processor may generate update information based on the POI information through a filtering generation module included in the memory. The processor may transmit the generated update information to the external electronic device through the communication module.

The processor of the electronic device according to various embodiments of the disclosure may store the POI information in an entire user POI table included in the memory.

The processor of the electronic device according to various embodiments of the disclosure may delete the specific POI information stored in the entire user POI table when receiving a signal requesting deletion of specific POI information from the external electronic device through the communication module.

The processor of the electronic device according to various embodiments of the disclosure may identify whether the specific POI information is deleted by a reference value or more when the specific POI information is deleted, and when deleted above the reference value, the specific POI information may be classified as sensitive information.

The processor of the electronic device according to various embodiments of the disclosure may analyze the generation density of other POI information having the same information as the POI information based on a minimum tile area when receiving POI information from the external electronic device through the communication module. The processor may update the update information based on the analysis result.

A method of an electronic device according to various embodiments of the disclosure may include obtaining second location information by refining the first location information when obtaining first location information that is a current location of the electronic device through the GPS module, determining whether the second location information is first sensitive information based on first security configuration information, filtering the second location information when the second location information is the first sensitive information, converting the second location information into point of interest (POI) information based on a mapping table when the second location information is not the first sensitive information, determining whether the POI information is second sensitive information based on second security configuration information, filtering the POI information when the POI information is the second sensitive information, and transmitting the POI information to an external electronic device through the communication module when the POI information is not the second sensitive information, and receiving update information from the external electronic device in response to transmitting the POI information.

In an operating method of an electronic device according to various embodiments of the disclosure, the electronic device may further include a memory including a filtering module. The filtering operation may include filtering the first sensitive information and the second sensitive information through the filtering module.

In an operating method of an electronic device according to various embodiments of the disclosure, the filtering may further include a first filtering operation of filtering the second location information when the second location information is the first sensitive information. The filtering may further include a second filtering operation of filtering the POI information when the POI information is the second sensitive information.

In an operating method of an electronic device according to various embodiments of the disclosure, the receiving the update information may include updating the filtering module based on the update information received from the outside.

In an operating method of an electronic device according to various embodiments of the disclosure, the refining may include obtaining the second location information by removing noise and reverse geocoding of the first location information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a global positioning system (GPS) module;
   a communication module; and
   a processor functionally connected to the GPS module and the communication module,
   wherein the processor is configured to:
   obtain second location information by refining first location information in case of obtaining the first location information that is a current location of the electronic device through the GPS module,
   determine whether the second location information is first sensitive information based on first security configuration information,
   filter the second location information in case that the second location information is the first sensitive information, and convert the second location information into point of interest (POI) information based on a mapping table in case that the second location information is not the first sensitive information, determine whether the POI information is second sensitive information based on second security configuration information, filter the POI information in case that the POI information is the second sensitive information, and transmit the POI information to an external electronic device through the communication module in case that the POI information is not the second sensitive information, and receive update information from the external electronic device in response to transmitting the POI information.

2. The electronic device of claim 1, further comprising:
a memory including a filtering module,
wherein the processor is further configured to filter the first sensitive information and the second sensitive information through the filtering module.

3. The electronic device of claim 2, wherein the processor is further configured to update the filtering module based on the update information received from the external electronic device.

4. The electronic device of claim 3, wherein the processor is further configured to store the POI information in a personal POI table included in the memory in case of determining that the POI information is not the second sensitive information.

5. The electronic device of claim 1, wherein the update information comprises avoidance information and an entire user POI table stored in the external electronic device.

6. The electronic device of claim 1, wherein the second location information comprises information refined by removing noise and reverse geocoding of the first location information.

7. The electronic device of claim 1, wherein the filtering comprises:
first filtering for filtering the second location information in case that the second location information is the first sensitive information; and
second filtering for filtering the POI information in case that the POI information is the second sensitive information.

8. The electronic device of claim 7, wherein the first filtering comprises:
specific time filtering for determining the second location information as the first sensitive information and filtering the second location information in case that the second location information is obtained at a specific time based on the first security configuration information,
specific area filtering for determining the second location information as the first sensitive information and filtering the second location information in case that the second location information is obtained at a specific area based on the first security configuration information; and
specific density filtering for determining the second location information as the second sensitive information and filtering the second location information in case that the area where the second location information is obtained is an area where the second location information of another user is obtained less than a specified value.

9. The electronic device of claim 7, wherein the second filtering comprises:
category filtering for determining the POI information as the second sensitive information and filtering the POI information in case that a category of the POI information is included in a category based on the second security configuration information,
smart filtering for determining the POI information as the second sensitive information and filtering the POI information in case that the POI information is included in avoidance information, and
specific context filtering for determining the POI information as the second sensitive information and filtering the POI information in case that a context of the POI information is included in a specified context based on the second security configuration information.

10. The electronic device of claim 9, wherein the avoidance information comprises:
POI information in which a number of deletion requests from other users is greater than or equal to a reference value,
POI information in violation of general data protection regulation (GDPR); and
sensitive POI information generated by unsupervised learning and supervised learning.

11. The electronic device of claim 9,
wherein the processor is further configured to filter at least one piece of information related to the specific context among other information stored in the electronic device based on the specific context, and
wherein the other information comprises at least one of image information, video information, address book information, call information, and text record information.

12. A method of an electronic device, the method comprising:
obtaining second location information by refining first location information in case of obtaining first location information that is a current location of the electronic device through a global positioning system (GPS) module;
determining whether the second location information is first sensitive information based on first security configuration information;
filtering the second location information in case that the second location information is the first sensitive information, and converting the second location information into point of interest (POI) information based on a mapping table in case that the second location information is not the first sensitive information;
determining whether the POI information is second sensitive information based on second security configuration information;
filtering the POI information in case that the POI information is the second sensitive information, and transmitting the POI information to an external electronic device through a communication module in case that the POI information is not the second sensitive information; and
receiving update information from the external electronic device in response to transmitting the POI information.

13. The method of claim 12, wherein the filtering comprises filtering the first sensitive information and the second sensitive information through a filtering module included in a memory of the electronic device.

14. The method of claim 12, wherein the filtering comprises:
first filtering for filtering the second location information in case that the second location information is the first sensitive information, and second filtering for filtering the POI information in case that the POI information is the second sensitive information.

15. The method of claim 12, wherein the refining comprises obtaining the second location information by removing noise and reverse geocoding of the first location information.

* * * * *